(12) United States Patent
Kim (10) Patent No.: US 12,027,718 B2
(45) Date of Patent: Jul. 2, 2024

(54) BATTERY MODULE CASE FOR ELECTRIC VEHICLE

(71) Applicant: ALMAC CO., LTD., Changwon-si (KR)

(72) Inventor: Su Wan Kim, Gwangju (KR)

(73) Assignee: ALMAC CO., LTD., Changwon-si (KR)

(*) Notice: Subject to any disclaimer, the term of this patent is extended or adjusted under 35 U.S.C. 154(b) by 225 days.

(21) Appl. No.: 17/609,074

(22) PCT Filed: Jul. 2, 2020

(86) PCT No.: PCT/KR2020/008629
§ 371 (c)(1),
(2) Date: Nov. 5, 2021

(87) PCT Pub. No.: WO2021/045366
PCT Pub. Date: Mar. 11, 2021

(65) Prior Publication Data
US 2022/0231372 A1 Jul. 21, 2022

(30) Foreign Application Priority Data

Sep. 6, 2019 (KR) .......................... 10-2019-0110500

(51) Int. Cl.
*H01M 50/249* (2021.01)
*H01M 50/271* (2021.01)

(52) U.S. Cl.
CPC ....... *H01M 50/249* (2021.01); *H01M 50/271* (2021.01); *H01M 2220/20* (2013.01)

(58) Field of Classification Search
CPC .......... H01M 2220/20; H01M 50/249; H01M 50/271; H01M 50/224; H01M 50/244;
(Continued)

(56) References Cited

U.S. PATENT DOCUMENTS 4,510,215 A * 4/1985 Adam ................. H01M 50/213
429/97
8,507,119 B2 * 8/2013 Itoi ..................... H01M 10/613
429/151
(Continued)

FOREIGN PATENT DOCUMENTS

JP 6065692 1/2017
KR 10-0875430 12/2008
(Continued)

*Primary Examiner* — James M Dolak
(74) *Attorney, Agent, or Firm* — LEX IP MEISTER, PLLC (57) ABSTRACT

The present invention provides a battery module case for an electric vehicle, wherein an electric vehicle battery provided to be utilized in an electric vehicle is accommodated inside the battery module case to improve assemblability. The battery module case for an electric vehicle is characterized by comprising: a case part which is formed by extrusion-molding an aluminum material, has a cavity formed in an inner profile corresponding to the outer profile of the battery for an electric vehicle, and is open in at least one end in the longitudinal direction, wherein a press-fit protrusion is formed along the edge of the open end; and at least one cover part which is formed by die-casting an aluminum material and provided so as to be coupled to the open end of the case part, and in which an extension portion is integrally formed to extend and protrude toward the case part from the edge thereof, at a position corresponding to the press-fit protrusion, so as to be press-fit on the edge of the press-fit protrusion, and both-side contacting grooves surrounding and closely contacting both sides of the press-fit protrusion are recessed in an end section of the extension portion.

3 Claims, 5 Drawing Sheets

(58) Field of Classification Search
CPC .. H01M 50/276; H01M 50/20; H01M 50/202; H01M 50/204; H01M 50/218; H01M 50/22; H01M 50/258; H01M 50/273; B60Y 2200/91; B60Y 2200/90; B60Y 2200/92

See application file for complete search history.

(56) References Cited

U.S. PATENT DOCUMENTS

| | | | | |
|---|---|---|---|---|
| 8,574,747 | B2* | 11/2013 | Okada | H01M 50/262 |
| | | | | 429/177 |
| 8,605,450 | B2* | 12/2013 | Kaneshige | H01M 10/425 |
| | | | | 361/752 |
| 8,722,224 | B2* | 5/2014 | Lee | H01M 10/6557 |
| | | | | 429/72 |
| 9,178,191 | B2* | 11/2015 | Park | H01M 50/262 |
| 9,184,425 | B2* | 11/2015 | Baek | H01M 50/213 |
| 9,236,590 | B2* | 1/2016 | Aoki | H01M 10/643 |
| 9,306,194 | B2* | 4/2016 | Kim | H01M 50/507 |
| 10,199,697 | B2* | 2/2019 | Addanki | H01M 10/625 |
| 10,276,847 | B2* | 4/2019 | Cho | H01M 10/04 |
| 10,347,886 | B2* | 7/2019 | Motokawa | H01M 10/425 |
| 10,381,618 | B2* | 8/2019 | Fees | H01M 10/0525 |
| 11,189,876 | B2* | 11/2021 | Lee | H01M 50/291 |
| 11,855,298 | B2* | 12/2023 | Kawakami | H01M 50/271 |
| 11,894,532 | B2* | 2/2024 | Kim | H01M 10/482 |
| 11,901,573 | B2* | 2/2024 | Fees | H01M 50/171 |
| 11,901,582 | B2* | 2/2024 | Terauchi | H01M 50/502 |
| 2008/0176134 | A1* | 7/2008 | Kim | H01M 50/55 |
| | | | | 429/7 |
| 2011/0293998 | A1* | 12/2011 | Sato | H01M 50/224 |
| | | | | 439/890 |
| 2015/0050538 | A1* | 2/2015 | Choi | H01M 50/507 |
| | | | | 429/121 |

FOREIGN PATENT DOCUMENTS

| | | |
|---|---|---|
| KR | 10-1191659 | 10/2012 |
| KR | 10-1826141 | 2/2018 |
| KR | 10-2019-0032887 | 3/2019 |

* cited by examiner

BATTERY MODULE CASE FOR ELECTRIC VEHICLE

TECHNICAL FIELD

The present invention relates to a battery module case for an electric vehicle and, more particularly, to a battery module case for an electric vehicle which has improved assemblability.

BACKGROUND ART

Generally, an electric vehicle means a vehicle operating using a driving force of a motor caused by energy of a battery.

Recently, research on a high-energy-density battery module and battery pack continues to maximize a driving range of an electric vehicle and interest in a mounting structure of a battery case mounted in an electric vehicle is increasing. Here, a conventional battery module is generally manufactured using an aluminum material and may include a body provided to have a hollow hexahedral shape with one open side to accommodate a battery and a cap covering an open part of the body. Here, since it is most economical to manufacture the body using extrusion (pullout) molding due to characteristics of the shape thereof, the body is generally manufactured using an extrusion molding method.

However, when a sharp protrusion protrudes and extends from an inside of the body formed through extrusion molding along a longitudinal direction due to a manufacturing defect, there is a serious problem that the battery is scratched and damaged by the protrusion when the battery is inserted into the body.

Meanwhile, the battery module may be manufactured by accommodating the battery inside the body and then coupling the body and the cap using a mechanical coupling method such as bolt fastening or the like or a laser welding method.

However, since it is necessary to further provide a component for forming a screw thread or a volume for bolt insertion into the body or the like and the cap in order to couple the battery module using a mechanical coupling method, an overall volume of the battery module increases. Accordingly, the volume of the battery module which has to be applied to an inside of the electric vehicle having a limited size increases such that space utilization is degraded.

Also, when the battery module is coupled using a laser welding method, due to the high cost of laser welding, economic feasibility and productivity are degraded. Particularly, a defect rate increases due to a melting error caused by an optimal output range difference for welding the body formed of aluminum materials through extrusion molding to the cap manufactured using aluminum materials through die casting such that the quality of a finally manufactured battery module is seriously degraded.

DISCLOSURE

Technical Problem

The present invention is directed to providing a battery module case for an electric vehicle which has improved assemblability.

Technical Solution

One aspect of the present invention provides a battery module case for an electric vehicle, in which a battery for an electric vehicle, which is provided to be applied to the electric vehicle, is accommodated. The battery module case includes a case portion formed of an aluminum material through extrusion molding and in which a hollow is formed with an internal profile corresponding to an external profile of the battery for an electric vehicle so that at least one of both ends in a longitudinal direction is opened while a press-fit protrusion is formed along an edge of the open end; and one or more cover portions formed of an aluminum material through die casting, provided to be coupled to the open end of the case portion, and in which an extending portion integrally extends and protrudes toward the case portion from a position of an edge corresponding to the press-fit protrusion to be press-fitted on the press-fit protrusion and a bifacial-close contacting groove surrounding both sides of the press-fit protrusion and brought into close contact therewith is formed to be recessed at an end of the extending portion.

Advantageous Effects

According to the present invention, the following effects are provided.

First, a press-fit protrusion formed in a case portion and a bifacial-close contacting groove formed in a cover portion are mutually press-fitted so that the occurrence of a welding defect between the case portion and the cover portion which are manufactured using different manufacturing methods of extrusion and die casting can be prevented in advance so that product quality and productivity can be significantly improved.

Second, since edges of both sides in a width direction of the bifacial-close contacting groove formed in the cover portion are shape-matched with and simultaneously surround both sides in a width direction of the press-fit protrusion formed in the case portion so that a width is reduced to be tapered toward an end, a coupling force between the case portion and the cover portion can be significantly improved regardless of repeated thermal deformation.

Third, since a catching and constraining protrusion and a catching and constraining groove which are provided on one side and the other side, opposing each other, among the press-fit protrusion and the bifacial-close contacting groove are mutually elastically caught and coupled, minute sliding movement of the press-fit protrusion caused by repetition of frequent thermal deformation can be restricted so as to prevent, in advance, detachment between the case portion and the cover portion even in the case of long-term use and to significantly improve the coupling force therebetween.

BEST MODE FOR INVENTION

Exemplary embodiments of the present invention will be described below in detail with reference to the attached drawings.

Modes of the Invention

Hereinafter, a battery module case for an electric vehicle according to an exemplary embodiment of the present invention will be described in detail with reference to the drawings.

Figure 1:
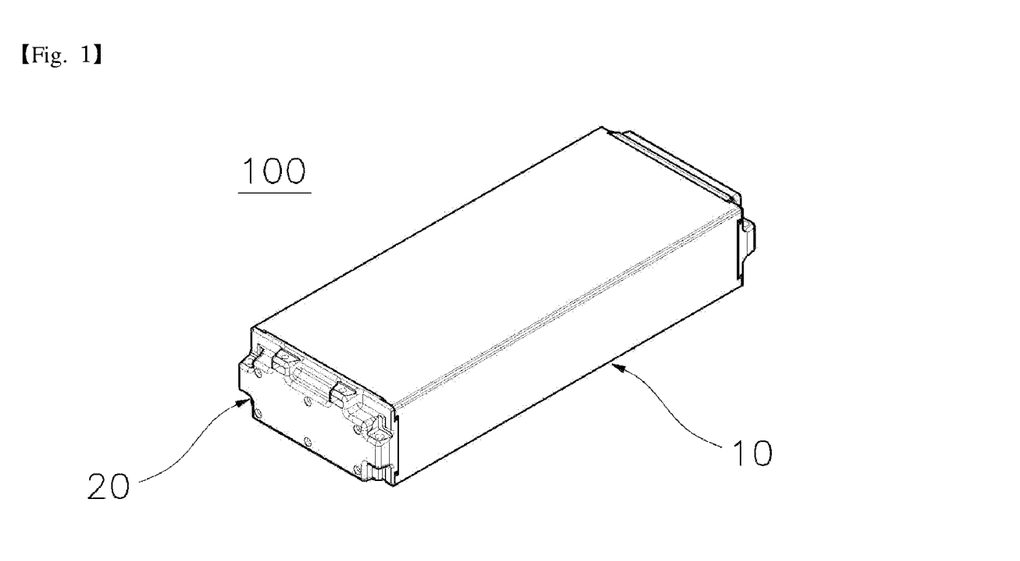
FIG. 1 is a perspective view illustrating a battery module case for an electric vehicle according to one embodiment of the present invention.
Figure 2:
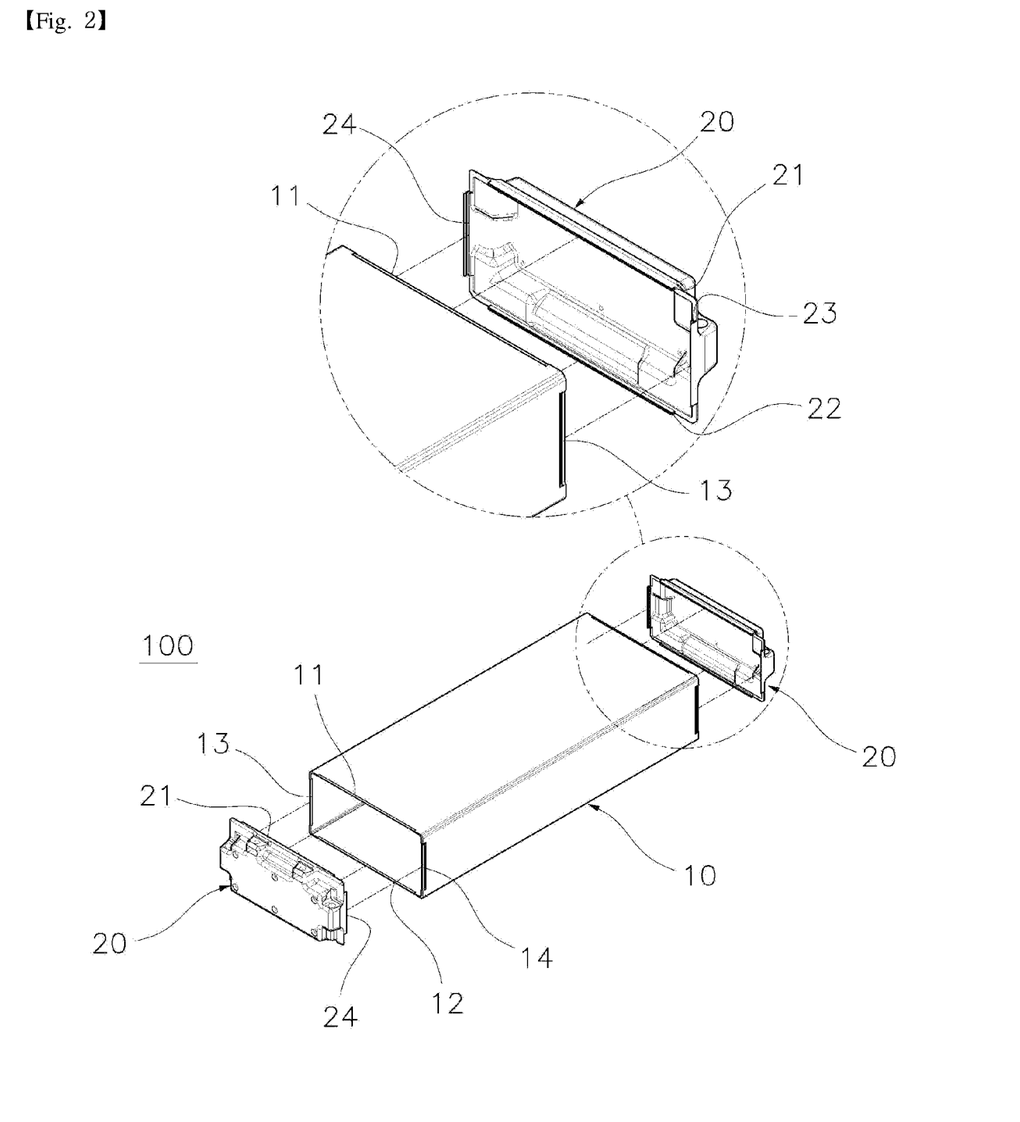
FIG. 2 is an exploded perspective view illustrating the battery module case for an electric vehicle according to one embodiment of the present invention.
Figure 3:
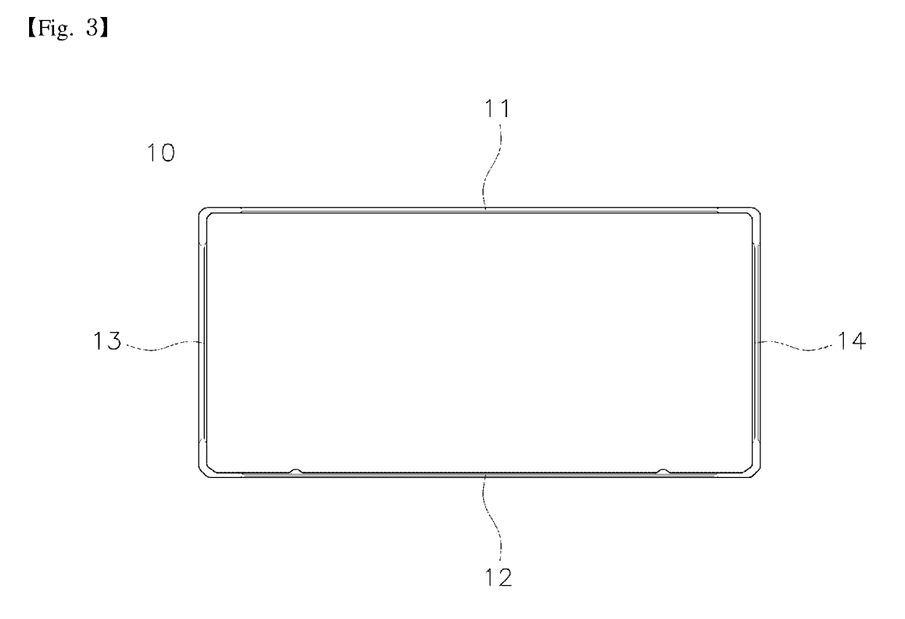
FIG. 3 is a front view illustrating a case portion of the battery module case for an electric vehicle according to one embodiment of the present invention.

FIG. 1 is a perspective view illustrating a battery module case for an electric vehicle according to one embodiment of the present invention, and FIG. 2 is an exploded perspective view illustrating the battery module case for an electric vehicle according to one embodiment of the present invention. FIG. 3 is a front view illustrating a case portion of the battery module case for an electric vehicle according to one embodiment of the present invention, and FIG. 4 is a rear view illustrating a cover portion of the battery module case for an electric vehicle according to one embodiment of the present invention.

Figure 4:
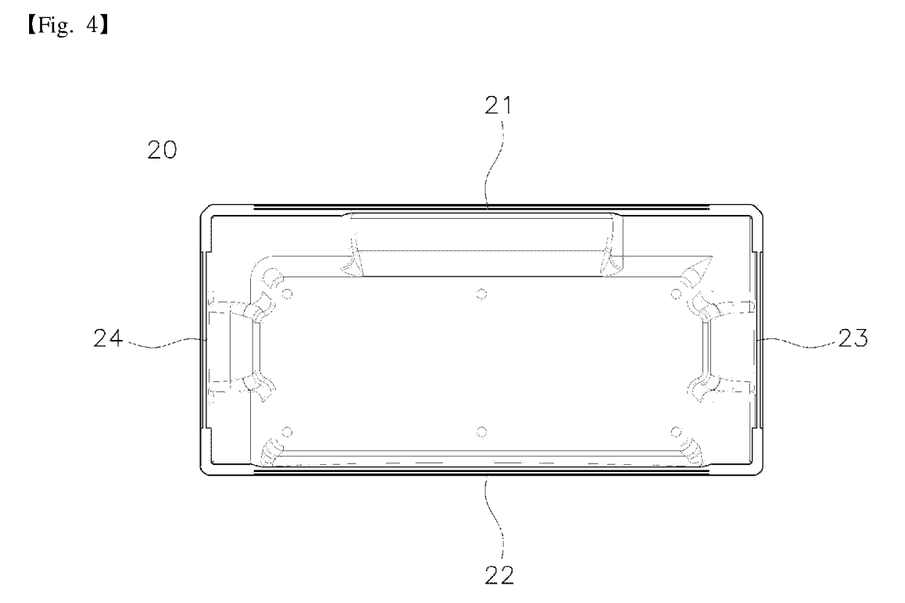
FIG. 4 is a rear view illustrating a cover portion of the battery module case for an electric vehicle according to one embodiment of the present invention.

As shown in FIGS. 1 and 4, a battery module case 100 for an electric vehicle according to one embodiment of the present invention includes a case portion 10 and a cover portion 20.

Here, the battery module case 100 for an electric vehicle is a device provided to accommodate a battery for an electric vehicle provided to be applied to an electric vehicle driven with electrical energy as a power source. Here, the term electric vehicle may be understood as being used as a concept including a pure electric vehicle and a hybrid vehicle.

Meanwhile, referring to FIGS. 1 to 3, the case portion 10 may include a hollow with an internal profile corresponding to an external profile of the battery for an electric vehicle so that at least one side among both ends in a longitudinal direction is opened. The case portion 10 is formed of an aluminum material through extrusion (pullout) molding.

Here, in one embodiment of the present invention, it will be described and illustrated by way of example that the case portion 10 is provided as a hollow rectangular parallelepiped and has both ends open in a longitudinal direction and a pair of cover portions 20 are provided corresponding thereto.

Also, the case portion 10 includes a plurality of press-fit protrusions 11, 12, 13, and 14 integrally protruding from a body of the case portion 10 along an edge of the open end. Here, the press-fit protrusions 11, 12, 13, and 14 may be integrally formed in a region of the edge of the open end of the case portion 10 except a corner portion.

Also, the press-fit protrusions 11, 12, 13, and 14 may be formed so that a width thereof is reduced to be tapered toward an end. Here, ends of the press-fit protrusions 11, 12, 13, and 14 and ends of corners of the edge of the open end of the case portion 10 may be formed with a mutually continuous profile. That is, a width of the ends of the press-fit protrusions 11, 12, 13, and 14 may be formed to be smaller than a width of the ends of the corners of the edge of the open end of the case portion 10.

Also, the press-fit protrusions 11, 12, 13, and 14 may include a first press-fit protrusion 11 formed on an upper side of the edge of the open end of the case portion 10 and a second press-fit protrusion 12 formed on a lower side of the edge of the open end of the case portion 10. Also, the press-fit protrusions 13, 14, 13, and 14 may include a third press-fit protrusion 13 formed on one side of the edge of the open end of the case portion 10 and a fourth press-fit protrusion 14 formed on the other side of the edge of the open end of the case portion 10.

Meanwhile, referring to FIGS. 1, 2, and 4, one or more cover portions 20 may be provided to be coupled to the open end of the case portion 10. Here, in one embodiment of the present invention, a pair of cover portions 20 may be provided to be coupled to both ends of the case portion 10, respectively. The cover portion 20 is formed of an aluminum material through die casting.

Here, although the case portion 10 formed through extrusion molding and the cover portion 20 formed through die casting are formed of the same aluminum material, due to a difference in molding methods, there is a melting error caused by a difference in optimal output ranges of a welding device for welding. Here, the cover portion 20 may be formed to have a cap shape with one open side facing the case portion 10 and may have one open surface facing the case portion 10. Also, an extending portion 25 (refer to FIG. 5) may extend and protrude toward the case portion 10 from a position corresponding to the press-fit protrusions 11, 12, 13, and 14 on an edge of the one surface of the cover portion 20.

Also, the cover portion 20 may include bifacial-close contacting grooves 21, 22, 23, and 24 formed to be recessed in the edge at positions corresponding to the press-fit protrusions 11, 12, 13, and 14 to be press-fitted on the press-fit protrusions 11, 12, 13, and 14. Here, the bifacial-close contacting grooves 21, 22, 23, and 24 may be recessed at the end of the extending portion 25 (refer to FIG. 5).

Here, the bifacial-close contacting grooves 21, 22, 23, and 24 may be pressed against to be press-fitted on and coupled to the press-fit protrusions 11, 12, 13, and 14 while surrounding both sides in a width direction of the press-fit protrusions. Also, the bifacial-close contacting grooves 21, 22, 23, and 24 may be integrally formed in a region of the edge of the cover portion 20 except a corner portion.

Also, the bifacial-close contacting grooves 21, 22, 23, and 24 may include a first bifacial-close contacting groove 21 formed on an upper side of the edge of the cover portion 20 and a second bifacial-close contacting groove 22 formed on a lower side of the edge of the cover portion 20. Also, the bifacial-close contacting grooves 23, 24, 23, and 24 may include a third bifacial-close contacting groove 23 formed on one side of the edge of the cover portion 20 and a fourth bifacial-close contacting groove 24 formed on the other side of the edge of the cover portion 20.

Here, the first press-fit protrusion 11 and the first bifacial-close contacting groove 21 may be mutually press-fitted, and the second press-fit protrusion 12 and the second bifacial-close contacting groove 22 may be mutually press-fitted. In addition, the third press-fit protrusion 13 and the third bifacial-close contacting groove 23 may be mutually press-fitted, and the fourth press-fit protrusion 14 and the fourth bifacial-close contacting groove 24 may be mutually press-fitted.

In this way, the press-fit protrusions 11, 12, 13, and 14 and the bifacial-close contacting grooves 21, 22, 23, and 24 are mutually press-fitted, respectively, such that external profile of the case portion 10 and the cover portion 20 may be formed to be a substantially continuous profile. Here, the corner portion of the edge of the open end of the case portion 10 and the corner portion of the edge of the cover portion 20 may come into surface contact with each other.

Accordingly, unlike a conventional case in which a body and a cap are coupled through expensive laser welding, the press-fit protrusions 11, 12, 13, and 14 formed in the case portion 10 and the bifacial-close contacting grooves 21, 22, 23, and 24 formed in the cover portion 20 are mutually press-fitted, respectively. In this way, expensive laser welding is not required so that economic feasibility may be improved and assembling convenience and manufacturing convenience may be improved through an easy assembling structure.

Particularly, the occurrence of a welding defect between the case portion 10 and the cover portion 20 which are manufactured using different manufacturing methods of extrusion and die casting such that a melting error caused by an optimum output range difference for mutual welding is prevented. Accordingly, product quality and productivity may be significantly improved.

Figure 5:
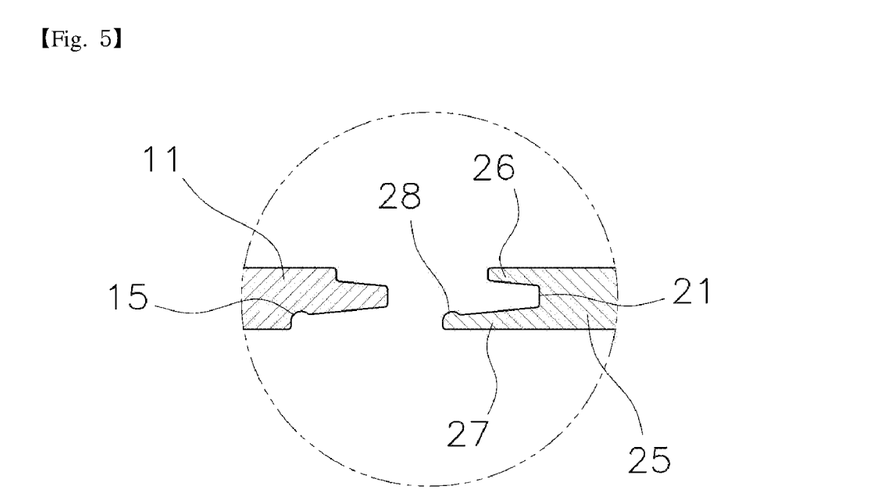
FIG. 5 is a cross-sectional view illustrating a press-fit protrusion and a bifacial-close contacting groove of the battery module case for an electric vehicle according to one embodiment of the present invention.

Meanwhile, FIG. 5 is a cross-sectional view illustrating the press-fit protrusion and the bifacial-close contacting groove of the battery module case for an electric vehicle according to one embodiment of the present invention. Here, the press-fit protrusion 11 shown in FIG. 5 is illustrated as an example of any one of the press-fit protrusions 11, 12, 13, and 14 shown in FIG. 2 and it should be understood that shapes of the respective press-fit protrusions 11, 12, 13, and 14 are substantially the same. In addition, the bifacial-close contacting groove 21 shown in FIG. 5 is illustrated as an example of any one of the bifacial-close contacting grooves 21, 22, 23, and 24 shown in FIG. 2 and it should be understood that shapes of the respective bifacial-close contacting grooves 21, 22, 23, and 24 are substantially the same.

As shown in FIG. 5, the press-fit protrusion 11 may be formed so that both sides in a width direction may be narrowed and reduced toward ends thereof and thus a width may be tapered. Here, the width direction means a direction from an outside portion of the case portion 10 exposed outward to an inside portion of the case portion 10 in which the battery for an electric vehicle is accommodated. That is, the press-fit protrusion 11 may be formed so that both sides in the width direction are simultaneously narrowed toward the end of the case portion 10.

Here, the press-fit protrusion 11 is press-fitted into and shape-matched with the bifacial-close contacting groove 12. To this end, a thickness of the press-fit protrusion 11 in the width direction may be slightly thicker than an inner width of the bifacial-close contacting groove 12. That is, the width of the press-fit protrusion 11 and the inner width of the bifacial-close contacting groove 12 may be formed to substantially correspond to each other.

Also, the bifacial-close contacting groove 21 may be formed with an internal profile corresponding to an external profile of the press-fit protrusion 11 to be shape-matched with the press-fit protrusion 11 while surrounding both sides of the press-fit protrusion in the width direction.

In detail, the bifacial-close contacting groove 21 may be formed to be recessed at an end of the extending portion 25 integrally protruding from the edge of one surface of the cover portion. Here, a pair of edges 26 and 27 may be formed on both sides of the bifacial-close contacting groove 21 in the width direction to surround both sides of the press-fit protrusion 11 in the width direction and brought into close contact therewith.

Here, the edges 26 and 27 may integrally extend from the extending portion 25 and include a first edge 26 and a second edge 27. Here, lengths of the first edge 26 and the second edge 27 may be formed to differ from each other. However, the lengths of the edges 26 and 27 may be formed to be equal.

For example, referring to FIG. 5, in the edges 26 and 27, a longitudinal length of the first edge 26 formed at a position exposed outside the cover portion may be formed to smaller than a longitudinal length of the second edge 27. In addition, the external profile of the case portion may be formed to correspond to the edges 26 and 27 so that respective ends of the edges 26 and 27 are shape-matched with the case portion of the press-fit protrusion 11 side. Also, a length of one of both sides of the press-fit protrusion 11 in the width direction which is exposed outside the case portion 10 may be smaller than a length of the other of both sides of the press-fit protrusion 11 in the width direction which is disposed inside the case portion 10. Accordingly, both edges 26 and 27 in the width direction of the bifacial-close contacting groove 21 formed in the cover portion simultaneously surround and are shape-matched with both sides in the width direction of the press-fit protrusion 11 formed to have a tapered width toward the end of the case portion. Accordingly, since coupling is easily and firmly performed through only mutual press-fitting without additional welding, product quality and manufacturing convenience may be improved.

Also, regardless of repeated thermal deformation of the battery for an electric vehicle, detachment between the case portion and the cover portion may be prevented in advance so as to significantly improve a coupling force therebetween. Here, as heating occurs in the battery for an electric vehicle, the case portion and the cover portion may repeatedly thermally expand and contract. Here, the thermal expansion of the case portion having a larger contact area with the battery for an electric vehicle is greater than thermal expansion of the cover portion. Accordingly, the thermal expansion of the press-fit protrusion 11 is greater than the thermal expansion of the bifacial-close contacting groove 21. That is, in an initial state of being thermally contracted, the press-fit protrusion 11 and the bifacial-close contacting groove 21 may be mutually press-fitted and the coupling force between the press-fit protrusion 11 and the bifacial-close contacting groove 21 may be firmly maintained even in the thermal expanded state.

Meanwhile, a catching and constraining protrusion 28 may protrude from an outer surface of one of the press-fit protrusion 11 and the bifacial-close contacting groove 21 and a catching and constraining groove 15 into which the catching and constraining protrusion 28 is elastically inserted to be caught and constrained may be recessed at an outer surface of the other which is opposite thereto.

That is, the catching and constraining protrusion 28 may be formed in any one of the press-fit protrusion 11 and the bifacial-close contacting groove 21, and the catching and constraining groove 15 may be formed in the other of the press-fit protrusion 11 and the bifacial-close contacting groove 21 which is opposite thereto.

Here, in one embodiment of the present invention, it has been illustrated and described by way of example that the catching and constraining groove 15 is recessed at an outer surface facing the catching and constraining protrusion 28 to allow the catching and constraining protrusion 28 to be elastically inserted into and constrained by the press-fit protrusion 11.

Also, in one embodiment of the present invention, it has been illustrated and described by way of example that the catching and constraining protrusion 28 protruding to face the press-fit protrusion 11 is formed on at least one of both edges 26 and 27 in the width direction of the bifacial-close contacting groove 21. Here, the catching and constraining protrusion 28 may be integrally formed with a rounded outer profile on at least any one of the ends of both edges 26 and 27 of the bifacial-close contacting groove 21 in the width direction.

Of course, in some cases, a catching and constraining protrusion may be formed on a press-fit protrusion and a catching and constraining groove may be formed in a bifacial-close contacting groove, and this may be understood as being included in the scope of the present invention.

Here, the catching and constraining protrusion 28 may integrally extend and protrude from at least any one of the edges 26 and 27 in an integrally rounded shape toward the press-fit protrusion 11. Also, a shape of a recessed profile of the catching and constraining groove 15 may be formed corresponding to the rounded external profile of the catching and constraining protrusion 27.

Here, in one embodiment of the present invention, it has been illustrated and described by way of example that the catching and constraining protrusion 28 is integrally formed with an end of the second edge 27 formed to be longer than the first edge 26. Of course, the catching and constraining protrusion 28 may be formed on the first edge 26 or may be formed on each of the first edge 26 and the second edge 27.

Also, although it has been illustrated and described by way of example in one embodiment of the present invention that the catching and constraining groove 15 is formed in one surface of the press-fit protrusion 11 opposite the second edge 26 and opposite to an accommodation region of the battery for an electric vehicle, the present invention is not limited thereto.

Also, when the press-fit protrusion 11 and the bifacial-close contacting groove 21 are shape-matched with each other to insert the catching and constraining protrusion 28 into the catching and constraining groove 15, the second edge 27 on which the catching and constraining protrusion 28 is formed may be temporarily elastically deformed. That is, when the press-fit protrusion 11 and the bifacial-close contacting groove 21 are shape-matched with each other, the catching and constraining protrusion 28 may come into contact with an outer surface of the press-fit protrusion 11 and the second edge 27 may be elastically deformed and then elastically restored.

Here, the second edge 27 may be provided to have a preset length or longer to allow the catching and constraining protrusion 28 to be elastic so that the catching and constraining protrusion 28 formed on the end of the second edge 27 is elastically inserted into the catching and constraining groove 15 to be caught and constrained. That is, since the second edge 27 is provided to have a preset length or longer to be elastically deformable, the catching and constraining protrusion 28 may be elastically inserted into the catching and constraining groove 15.

Accordingly, after the battery for an electric vehicle is accommodated in the case portion, the press-fit protrusion 11 and the bifacial-close contacting groove 21 may be shape-matched with each other and the catching and constraining protrusion 28 and the catching and constraining groove 15 may be mutually caught and constrained. Accordingly, since the case portion and the cover portion may be easily coupled through only mutual press-fitting, manufacturing convenience may be significantly improved.

Here, the battery for an electric vehicle is repeatedly heated and cooled according to driving conditions such that the case portion accommodating the battery for an electric vehicle and the cover portion coupled thereto are thermally deformed.

Here, when a catching and constraining structure between the catching and constraining protrusion 28 and the catching and constraining groove 15 is not formed, the cover portion may be detached from the case portion whenever thermal deformation of the battery for an electric vehicle is repeated. Accordingly, the catching and constraining protrusion 28 formed with a rounded external profile on at least one of the ends of both edges 26 and 27 of the bifacial-close contacting groove 21 in the width direction is elastically inserted into and then restored to be constrained by the catching and constraining groove 15 formed to be recessed in the press-fit protrusion 11. Accordingly, detachment between the case portion and the cover portion which is caused by repeated thermal deformation of the battery for an electric vehicle may be prevented in advance so as to significantly improve the coupling force therebetween.

As described above, the catching and constraining protrusion 28 and the catching and constraining groove 15 provided on one side and the other side, opposing each other, among the press-fit protrusion 11 and the bifacial-close contacting groove 21 are mutually and elastically caught and coupled. Accordingly, minute sliding movement of the press-fit protrusion 11 caused by repetition of frequent thermal deformation is restricted so that detachment between the case portion and the cover portion may be prevented in advance even in the case of long-term use so as to significantly improve a coupling force.

Figure 6:
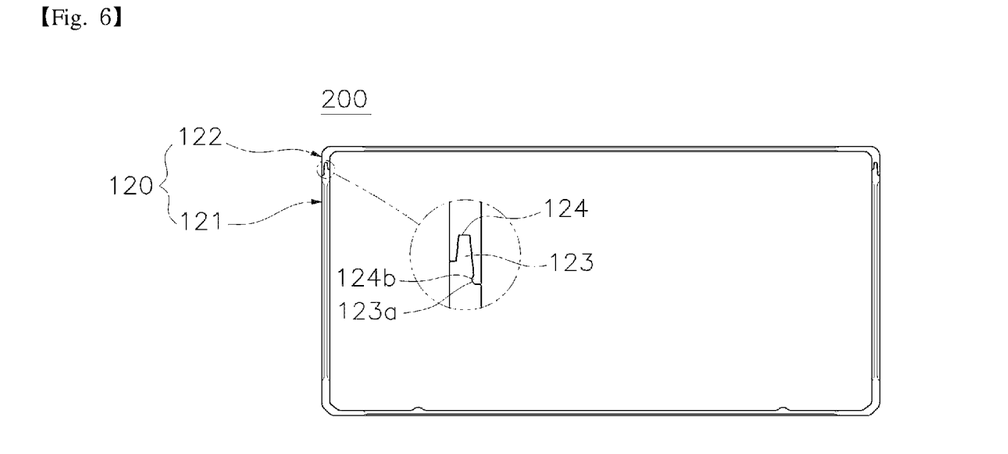
FIG. 6 is a front view illustrating a case portion of a battery module case for an electric vehicle according to a modified example of one embodiment of the present invention.
Figure 7:
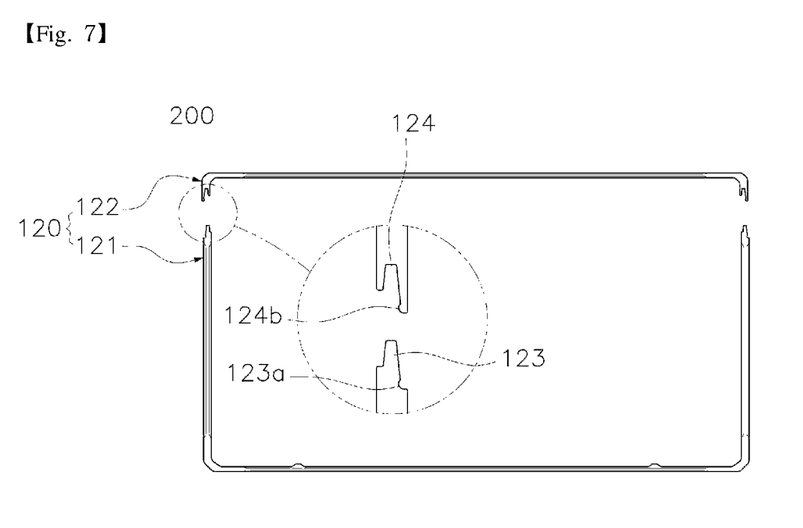
FIG. 7 is an exploded front view illustrating the case portion of the battery module case for an electric vehicle according to the modified example of one embodiment of the present invention.

Meanwhile, FIG. 6 is a front view illustrating a case portion of a battery module case for an electric vehicle according to a modified example of one embodiment of the present invention, and FIG. 7 is an exploded front view illustrating the case portion of the battery module case for an electric vehicle according to the modified example of one embodiment of the present invention. Since basic components of the modified example of one embodiment of the present invention except a case portion 120 are the same as those of the above-described one embodiment, a detailed description of the same components will be omitted.

As shown in FIGS. 6 and 7, a battery module case 200 for an electric vehicle according to the modified example of one embodiment of the present invention includes a case portion 120 and a cover portion (not shown).

Here, the case portion 120 may include a first case portion 121 and a second case portion 122. Here, the first case portion 121 are separately manufactured from the second case portion 122 and coupled to each other while a hollow may be formed with an internal profile corresponding to an external profile of the battery for an electric vehicle so that at least any one of both ends in a longitudinal direction may be opened. The first case portion 121 and the second case portion 122 may be formed of an aluminum material through extrusion molding.

Also, a plurality of press-fit protrusions may integrally protrude from the first case portion 121 and the second case portion 122 along edges of ends in a longitudinal direction. Here, a first press-fit protrusion may be formed on the first case portion 121, and a second press-fit protrusion, a third press-fit protrusion, and a fourth press-fit protrusion may be formed on the second case portion 122. Here, since the shapes of the first press-fit protrusion, the second press-fit protrusion, the third press-fit protrusion, and the fourth press-fit protrusion are the same as those according to one embodiment, a detailed description will be omitted.

In one embodiment of the present invention, it has been illustrated and described by way of example that an overall shape of the case portion 120 is provided as a hollow rectangular parallelepiped and both open ends in a longitudinal direction are opened. Also, the first case portion 121 and the second case portion 122 may be understood as being separately manufactured to form an upper side and a lower side of the overall case portion, respectively, and coupled to each other.

In detail, the first case portion 121 may be formed with an internal profile corresponding to an external profile of one side of the battery for an electric vehicle. Also, the second case portion 122 is detachably coupled to the first case portion 121 while being formed with an internal profile corresponding to an external profile of the other side of the battery for an electric vehicle.

Also, a shape-matching protrusion 123 may protrude from an opposite portion of one of the first case portion 121 and the second case portion 122. Here, the opposite portion means a region in which the first case portion 121 and the second case portion 122 come into contact with each other.

Also, a shape-matching groove 124 may be recessed in an opposite portion of the other of the first case portion 121 and the second case portion 122 so that the shape-matching protrusion 123 is insertion-coupled thereto. Here, the shape-matching protrusion 123 and the shape-matching groove 124 may be formed to extend from respective opposite surfaces of the first case portion 121 and the second case portion 122 in a longitudinal direction. Here, although it has been illustrated and described by way of example in the modified example of one embodiment of the present invention that the shape-matching protrusion 123 is formed on the first case portion 121 and the shape-matching groove 124 is formed in the second case portion 122, the present invention is not limited thereto.

In detail, the shape-matching protrusion 123 may be formed so that both sides in a width direction are narrowed to be tapered toward ends thereof. That is, the shape-matching protrusion 123 may be formed so that both sides in the width direction are simultaneously narrowed toward an end of the first case portion 121.

Here, the shape-matching protrusion 123 is press-fitted into and shape-matched with the shape-matching groove 124. To this end, a thickness of the shape-matching protrusion 123 in the width direction may be slightly thicker than an inner width of the shape-matching groove 124. That is, the width of the shape-matching protrusion 123 and the inner width of the shape-matching groove 124 may be formed to substantially correspond to each other.

Also, the shape-matching groove 124 may be formed with an internal profile corresponding to an external profile of the shape-matching protrusion 123 to be shape-matched with the shape-matching protrusion 123 while surrounding both sides of the shape-matching protrusion 123 in the width direction. In detail, the shape-matching groove 124 may be formed to be recessed at the end of the second case portion 122 opposite to the shape-matching protrusion 123. Here, a pair of shape-matching edges may be formed on both sides of the shape-matching groove 124 in the width direction to surround the both sides of the shape-matching protrusion 123 in the width direction and brought into close contact therewith.

Here, the respective shape-matching edges may include a first shape-matching edge and a second shape-matching edge. Here, lengths of the first shape-matching edge and the second shape-matching edge may be formed to differ from each other. However, the lengths of the respective shape-matching edges may be formed to be the same.

For example, referring to FIG. 7, among the shape-matching edges, a longitudinal length of the first shape-matching edge formed at a position exposed outside the second case portion 122 may be formed to be smaller than a longitudinal length of the second shape-matching edge. In addition, to allow ends of the shape-matching edges to be shape-matched with the first case portion 121 on a side of the shape-matching protrusion 123, an external profile of the first case portion 121 may be formed to correspond to the shape-matching edges. Also, a length of one of both sides of the shape-matching protrusion 123 in the width direction which is exposed outside the first case portion 121 may be formed to be smaller than a length of the other of both sides of the shape-matching protrusion 123 in the width direction which is disposed inside the first case portion 121.

Accordingly, the shape-matching edges on both sides in the width direction of the shape-matching groove 124 formed in the second case portion 122 simultaneously surround and are shape-matched with both sides in the width direction of the shape-matching protrusion 123 formed on the first case portion so that the width is reduced to be tapered toward the end. Accordingly, since coupling is firmly and easily performed through only mutual press-fitting without additional welding, product quality and manufacturing convenience may be improved.

Meanwhile, a fixing and constraining groove 124b may be formed to be recessed in an outer surface of the shape-matching protrusion 123 opposite a fixing and constraining protrusion 123a which will be described below to allow the fixing and constraining protrusion 123a to be elastically inserted thereinto and constrained.

Also, the fixing and constraining protrusion 123a may be integrally formed with a rounded external profile while protruding to be opposite the shape-matching protrusion 123 on at least one of the shape-matching edges on both sides in the width direction of the shape-matching groove 124.

Here, the fixing and constraining protrusion 123a may be formed to extend and protrude from at least one of the shape-matching edges in an integrally rounded shape toward the shape-matching protrusion 123. Also, a recessed profile of the fixing and constraining groove 124b may be formed to correspond to a rounded external profile of the fixing and constraining protrusion.

Here, in the modified example of one embodiment of the present invention, it has been illustrated and described by way of example that the fixing and constraining protrusion 123a is integrally formed at the end of the second shape-matching edge formed to be longer than the first shape-matching edge. Of course, the first fixing and constraining protrusion 123a may be formed on the first shape-matching edge or may be formed on each of the first shape-matching edge and the second shape-matching edge. Also, although it has been illustrated and described by way of example in one embodiment of the present invention that the fixing and constraining groove 124b is opposite the second shape-matching edge and formed in one surface of the shape-matching protrusion 123 opposite the region accommodating the battery for an electric vehicle, the present invention is not limited thereto.

Also, in order to insert the fixing and constraining protrusion 123a into the fixing and constraining groove 124b, when the shape-matching protrusion 123 and the shape-matching groove 124 are shape-matched with each other, the second shape-matching edge on which the fixing and constraining protrusion 123a is formed may be temporarily elastically deformed. That is, when the shape-matching protrusion 123 and the shape-matching groove 124 are shape-matched with each other, the fixing and constraining protrusion 123a comes into contact with an outside of the shape-matching protrusion 123 and the second shape-matching edge may be elastically deformed and then elastically restored. Accordingly, after the battery for an electric vehicle is accommodated inside the first case portion 121 and the second case portion 122, the shape-matching protrusion 123 and the shape-matching groove 124 may be shape-matched with each other and the fixing and constraining protrusion 123a and the fixing and constraining groove 124b may be mutually caught and constrained.

Also, the battery for an electric vehicle may be inserted between the first case portion 121 and the second case portion 122 which are separated from each other. Accordingly, the damage caused by scratches or the like which may occur when insertion is performed in a longitudinal direction of the case portion 120 may be prevented in advance. Here, since the battery for an electric vehicle is repeatedly heated and cooled several times according to an operating state, the first case portion 121 and the second case portion 122 which accommodate the battery for an electric vehicle are thermally deformed.

Here, when a catching and constraining structure between the fixing and constraining protrusion 123a and the fixing and constraining groove 124b is not formed, the second case portion 122 may be detached from the first case portion 121 due to repeated thermal deformation of the battery for an electric vehicle.

Accordingly, the fixing and constraining protrusion 123a formed with the rounded external profile on at least one of the ends of the shape-matching edges on both sides in the width direction of the shape-matching groove 124 is elastically inserted into the fixing and constraining groove 124b formed to be recessed in the shape-matching protrusion 123 and restored and restricted. Accordingly, the detachment between the first case portion 121 and the second case portion 122 caused by repetition of thermal deformation of the battery for an electric vehicle may be prevented in advance so as to significantly improve the coupling force therebetween.

In addition, since the first case portion 121 and the second case portion 122 are separately manufactured and stacked to reduce a hollow volume, space utilization may be improved and the number of products transportable at one time may increase so as to significantly improve economic feasibility.

Although the embodiments of the present invention have been described above, the present invention is not limited thereto and various modifications thereof may be made by one of ordinary skill in the art without departing from the scope of the present invention defined in the claims thereof and belong to the scope of the present invention.

INDUSTRIAL APPLICABILITY

The present invention is applicable to the industrial field of manufacturing and using an electric vehicle by providing a battery module case for the electric vehicle.

The invention claimed is:

1. A battery module case, in which a battery is accommodated, the battery module case comprising:
a case portion formed of an aluminum material through extrusion molding and in which a hollow is formed with an internal profile corresponding to an external profile of the battery so that at least one of both ends in a longitudinal direction is opened while a press-fit protrusion is formed along an edge of the open end; and
one or more cover portions formed of an aluminum material through die casting, coupled to the open end of the case portion, wherein the cover portions include an extending portion integrally extends and protrudes toward the case portion from an edge of the cover portions corresponding to the press-fit protrusion to be press-fitted on the press-fit protrusion, wherein the extending portion includes a bifacial-close contacting groove in which the press-fit protrusion is inserted and both sides of the press-fit protrusion is surrounded by the extending portion and brought into close contact with the extending portion,
wherein both sides of the press-fit protrusion in a width direction are formed so that a width of the press-fit protrusion is narrowed to be tapered toward an end, and the bifacial-close contacting groove is formed with an internal profile corresponding to an external profile of the press-fit protrusion to be shaped-matched with the press-fit protrusion,
wherein the extending portion includes a first edge and a second edge which integrally extend to surround both sides of the press-fit protrusion in the width direction and form the bifacial-close contacting groove therebetween,
wherein a catching and constraining protrusion is formed with a rounded external profile on an outer surface of the first edge to integrally protrude toward the press-fit protrusion, and a catching and constraining groove into which the catching and constraining protrusion is elastically inserted to be caught and constrained is formed with a profile corresponding to the rounded external profile of the catching and constraining protrusion in one surface of the press-fit protrusion, and
wherein the first edge is longer than the second edge to allow the catching and constraining protrusion to be elastically inserted into the catching and constraining groove.

2. The battery module case of claim 1, wherein the press-fit protrusion is integrally formed in a region of the edge of the open end of the case portion and is not disposed at a corner portion of the open end of the case portion, and
wherein the bifacial-close contacting groove is integrally formed in a region of the edge of the cover portion and is not disposed at a corner portion of the cover portions.

3. The battery module case of claim 1, wherein the case portion comprises:
a first case portion having an internal profile corresponding to an external profile of one side of the battery; and
a second case portion detachably coupled to the first case portion and having an internal profile corresponding to an external profile of the other side of the battery, and
wherein a shape-matching protrusion is formed to protrude from an opposite portion of one of the first case portion and the second case portion, and a shape-matching groove is formed to be recessed in an opposite portion of the other of the first case portion and the second case portion to allow the shape-matching protrusion to be insertion-coupled.

* * * * *